(12) United States Patent
Deyoe et al.

(10) Patent No.: US 7,024,366 B1
(45) Date of Patent: Apr. 4, 2006

(54) SPEECH RECOGNITION WITH USER SPECIFIC ADAPTIVE VOICE FEEDBACK

(75) Inventors: Scott A Deyoe, Greentown, IN (US); Tuan A. Hoang, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/483,699

(22) Filed: Jan. 14, 2000

Related U.S. Application Data

(63) Continuation-in-part of application No. 09/480,227, filed on Jan. 10, 2000, now abandoned.

(51) Int. Cl.
*G10L 21/00* (2006.01)
*G10L 17/00* (2006.01)
(52) U.S. Cl. ............... 704/270.1; 704/275; 704/246
(58) Field of Classification Search ............ 704/231, 704/246, 251, 270, 275, 270.1
See application file for complete search history.

(56) References Cited

U.S. PATENT DOCUMENTS

| | | | |
|---|---|---|---|
| 4,506,378 A | | 3/1985 | Noso et al. |
| 4,827,520 A | | 5/1989 | Zeinstra ........................ 381/43 |
| 5,440,606 A | | 8/1995 | Faul et al. |
| 5,493,608 A | * | 2/1996 | O'Sullivan ................ 379/88.04 |
| 5,553,121 A | * | 9/1996 | Martin et al. ............. 379/88.01 |
| 5,566,271 A | | 10/1996 | Tomitsuka et al. |
| 5,583,965 A | | 12/1996 | Douma et al. |
| 5,592,583 A | * | 1/1997 | Sakurai ....................... 704/200 |
| 5,719,950 A | | 2/1998 | Osten et al. |
| 5,765,130 A | * | 6/1998 | Nguyen ........................ 704/233 |
| 5,774,858 A | | 6/1998 | Taubkin et al. |
| 6,018,711 A | * | 1/2000 | French-St. George et al. ......... 455/231 |
| 6,144,938 A | * | 11/2000 | Surace et al. ................ 704/257 |
| 6,240,347 B1 | * | 5/2001 | Everhart et al. ............... 701/36 |
| 6,314,401 B1 | | 11/2001 | Abbe et al. |
| 6,334,103 B1 | * | 12/2001 | Surace et al. ................ 704/257 |
| 6,336,091 B1 | * | 1/2002 | Polikaitis et al. ........... 704/233 |
| 2001/0056349 A1 | | 12/2001 | St. John |

* cited by examiner

*Primary Examiner*—Angela A. Armstrong
(74) *Attorney, Agent, or Firm*—Stefan V. Chmielewski

(57) ABSTRACT

A multi-level speech recognition driven system provides user specific adaptive voice feedback based on a specific user's level of sophistication. If a voice input is detected, the system determines whether the voice input is associated with a specific user. When a user of the system has not provided a voice input for a predetermined user specific time period the system provides an adaptive voice feedback to the user. When a voice input is detected, the system determines whether the voice input is recognized. If the recognized voice input corresponds to a speech selectable task, the corresponding speech selectable task is performed. In another embodiment, the system is deactivated when a voice input has not been received for a user specific set number of predetermined user specific time periods at a given level.

60 Claims, 8 Drawing Sheets

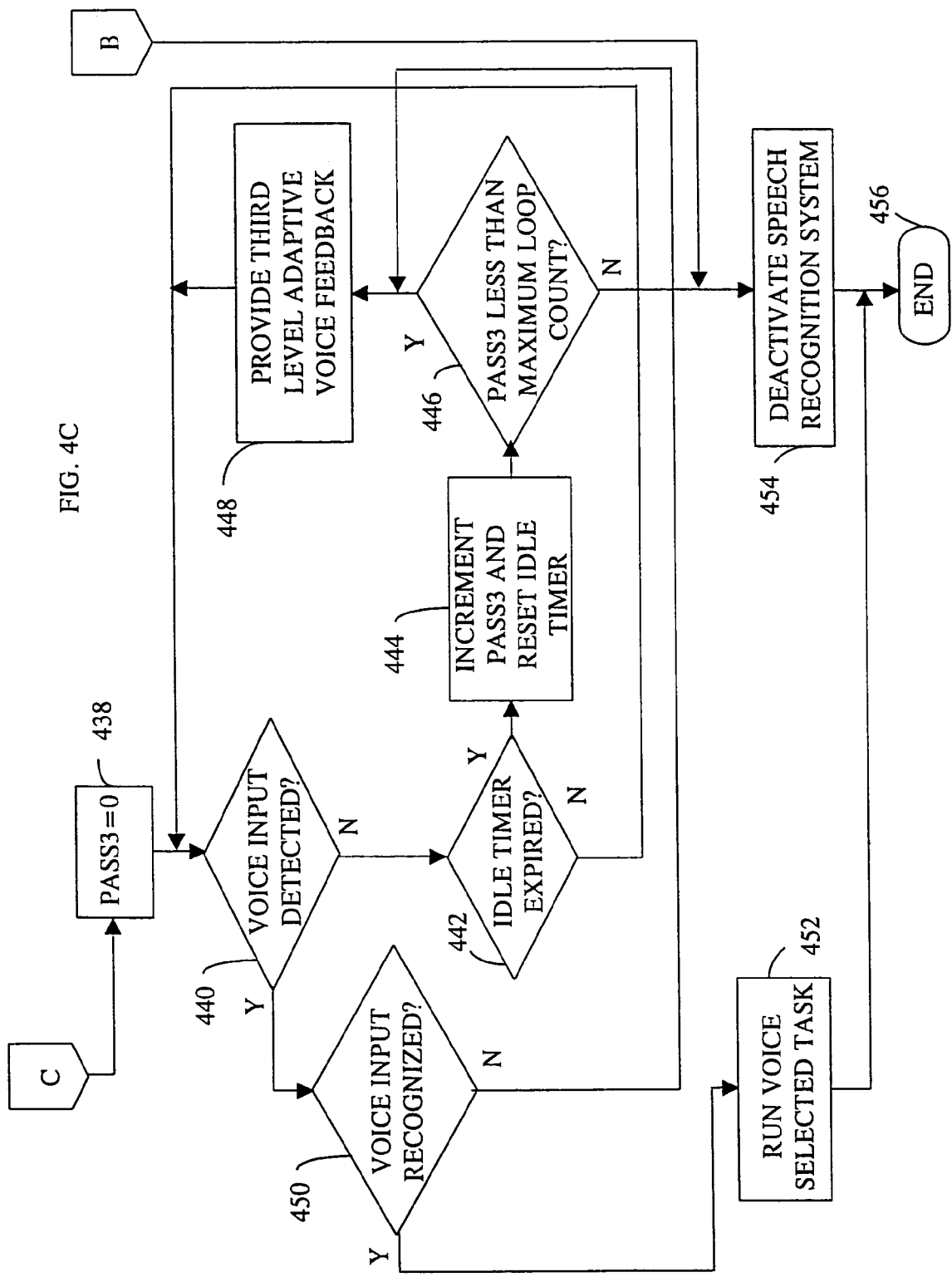

SPEECH RECOGNITION WITH USER SPECIFIC ADAPTIVE VOICE FEEDBACK

This application is a continuation-in-part of U.S. patent application Ser. No. 09/480,227, filed Jan. 10, 2000, abandoned, entitled "SPEECH RECOGNITION WITH ADAPTIVE VOICE FEEDBACK" to Scott A. Deyoe, Tuan A. Hoang and Shishong Huang.

BACKGROUND OF THE INVENTION

The present invention is directed to speech recognition, and more specifically to providing user specific adaptive voice feedback in a multi-level speech recognition driven system.

As is well known to one of ordinary skill in the art, speech recognition is a field in computer science that deals with designing computer systems that can recognize spoken words. A number of speech recognition systems are currently available (e.g., products are offered by IBM, Dragon Systems, Lernout & Hauspie and Philips). Traditionally, speech recognition systems have only been used in a few specialized situations due to their cost and limited functionality. For example, such systems have been implemented when a user was unable to use a keyboard to enter data because the user's hands were disabled. Instead of typing commands, the user spoke into a microphone. However, as the cost of these systems has continued to decrease and the performance of these systems has continued to increase, speech recognition systems are being used in a wider variety of applications (as an alternative to keyboards or other user interfaces). For example, speech actuated control systems have been implemented in motor vehicles to control various accessories within the motor vehicles.

A typical speech recognition system, that is implemented in a motor vehicle, includes voice processing circuitry and memory for storing data representing command words (that are employed to control various vehicle accessories). In a typical system, a microprocessor is utilized to compare the user provided data (i.e., voice input) to stored speech models to determine if a word match has occurred and provide a corresponding control output signal in such an event. The microprocessor has also normally controlled a plurality of motor vehicle accessories, e.g., a cellular telephone and a radio. Such systems have advantageously allowed a driver of the motor vehicle to maintain vigilance while driving the vehicle.

Some speech recognition systems also recognize (by utilizing voice recognition technology) a specific user. However, most current speech recognition systems require a user to learn unique wording and dialogs for successful operation of the system. Many of these systems have very long voice dialog prompts to direct a user such that the dialog can progress. Further, the help function of most of these systems has required the user to request assistance via a voice command, such as "Help" or "What can I say?" at which point the user is then provided with an available word or dialog option. These systems have typically been inflexible and not readily adaptable as the ability of the user of the system changed.

As such, a speech recognition system that adapts to a specific user by providing assistance automatically and only as needed is desirable.

SUMMARY OF THE INVENTION

The present invention is directed to a technique for providing user specific adaptive voice feedback in a multi-level speech recognition driven system. Initially, the system detects whether a user of the system has provided a voice input. If a voice input is detected, the system then determines whether the voice input is associated with a specific user that is recognized by the system. If the user has not provided a voice input for a predetermined user specific time period, the system provides adaptive voice feedback to the user. When the system receives or detects a voice input from the user, the system determines whether the input is recognized. If the input is recognized by the system, the speech selectable task that corresponds to the input is performed. In another embodiment, when the user has failed to respond for a user specific set number of the predetermined user specific time periods, at a given level, the system is deactivated.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which:

FIGS. 4A–4C are a flow diagram of an adaptive voice feedback routine, according to another embodiment of the present invention.

DESCRIPTION OF THE PREFERRED EMBODIMENTS

Figure 1:
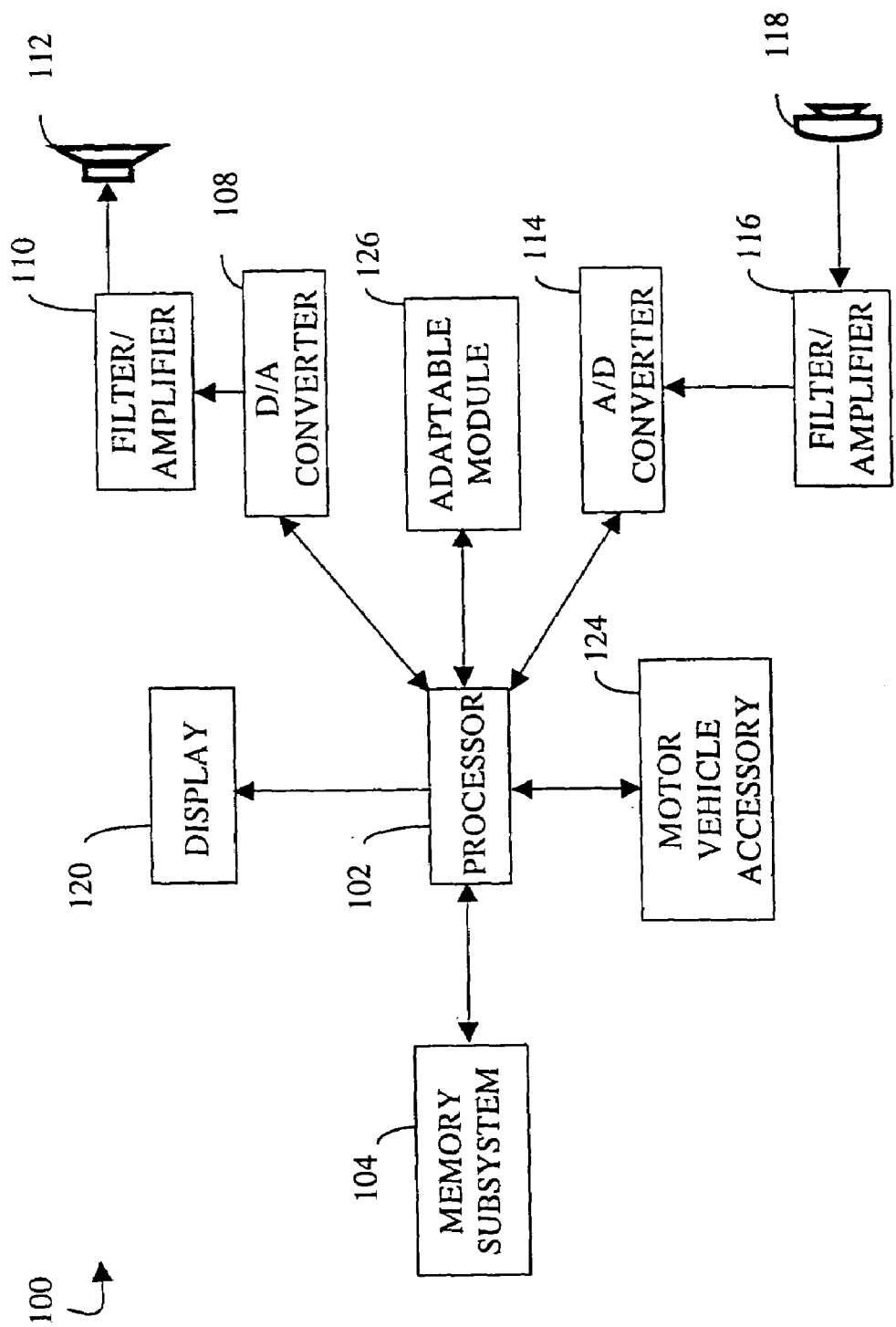
FIG. 1 is a block diagram of a speech recognition system used in a motor vehicle.

FIG. 1 is a block diagram of a speech recognition system 100 (implemented within a motor vehicle) that provides adaptive voice feedback, according to an embodiment of the present invention. System 100 includes a processor 102 coupled to a motor vehicle accessory 124 and a display 120. Processor 102 controls motor vehicle accessory 124, at least in part, as dictated by voice input supplied by a user of system 100. Processor 102 also supplies various information to display 120, to allow a user of the motor vehicle to better utilize system 100. In this context, the term processor may include a general purpose processor, a microcontroller (i.e., an execution unit with memory, etc., integrated within a single integrated circuit) or a digital signal processor (DSP). Processor 102 is also coupled to a memory subsystem 104. Memory subsystem 104 includes an application appropriate amount of main memory (volatile and non-volatile).

An audio input device 118 (e.g., a microphone) is coupled to a filter/amplifier module 116. Filter/amplifier module 116 filters and amplifies the voice input provided by the user through audio input device 118. Filter amplifier module 116 is also coupled to an analog-to-digital (A/D) converter 114. A/D converter 114 digitizes the voice input from the user and supplies the digitized voice to processor 102 (which causes the voice input to be compared to system recognized commands).

Processor 102 executes various routines in determining whether the voice input corresponds to a system recognized command. Processor 102 also causes an appropriate voice output to be provided to the user (ultimately through an audio output device 112). The synthesized voice output is provided by the processor 102 to a digital-to-analog (D/A) converter 108. D/A converter 108 is coupled to a filter/amplifier section 110, which amplifies and filters the analog voice output. The amplified and filtered voice output is then provided to audio output device 112 (e.g., a speaker). While only one motor vehicle accessory module 124 is shown, it is contemplated that any number of accessories, typically provided in a motor vehicle (e.g., a cellular telephone or a radio), can be implemented.

Processor 102 may execute a routine or may be coupled to an adaptable module 126 (which can include artificial intelligence (AI) code, fuzzy logic, a neural network or any other such appropriate technology) that can identify the specific dialogs a specific user has mastered and those dialogs that require additional assistance. This enables the system to adjust the timing in which assistance, in the form of adaptive voice feedback, is provided to a specific user and is further discussed in conjunction with FIGS. 4A–4C.

Figure 2A:
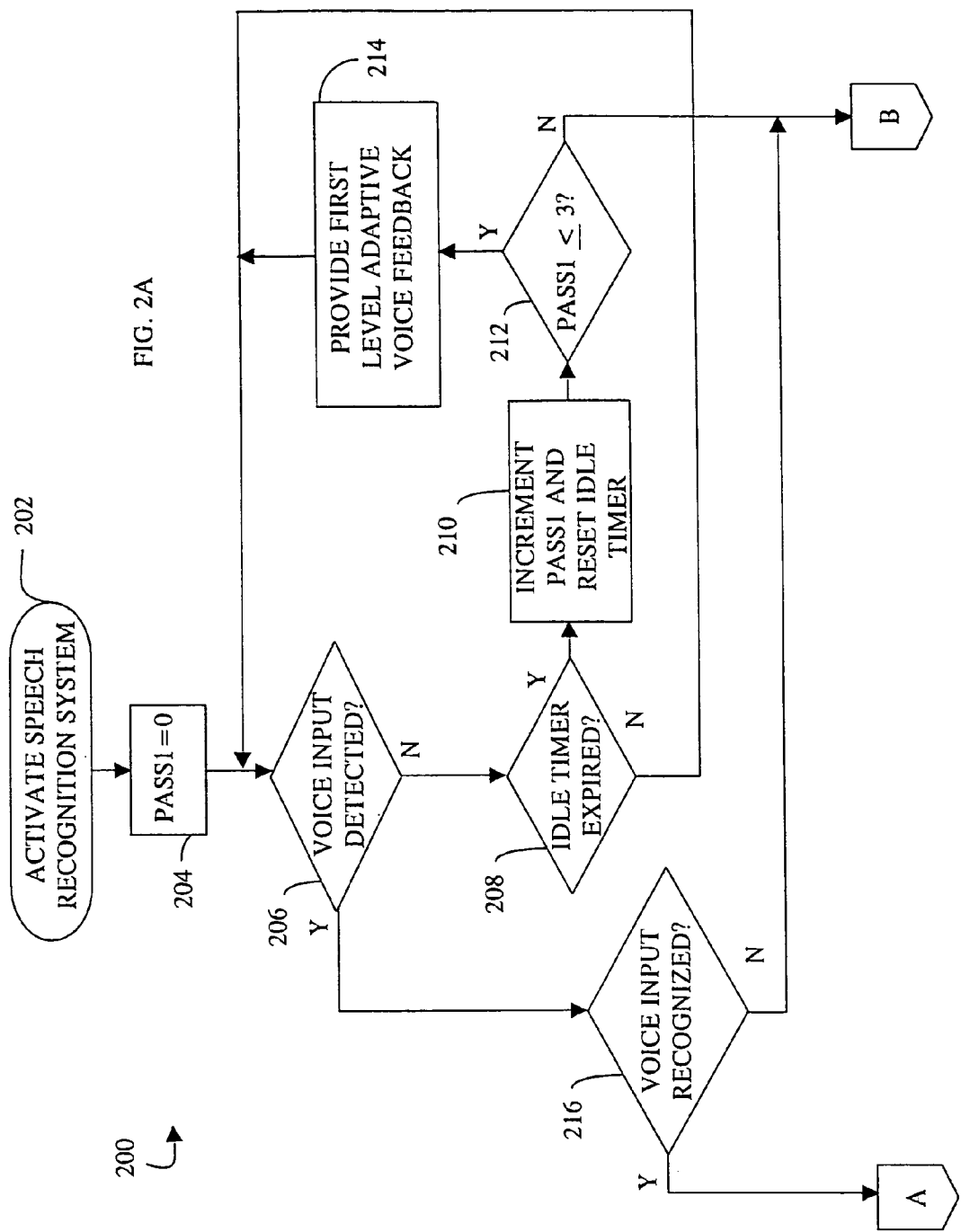
FIGS. 2A–2C are a flow diagram of an adaptive voice feedback routine, according to an embodiment of the present invention.
Figure 2B:
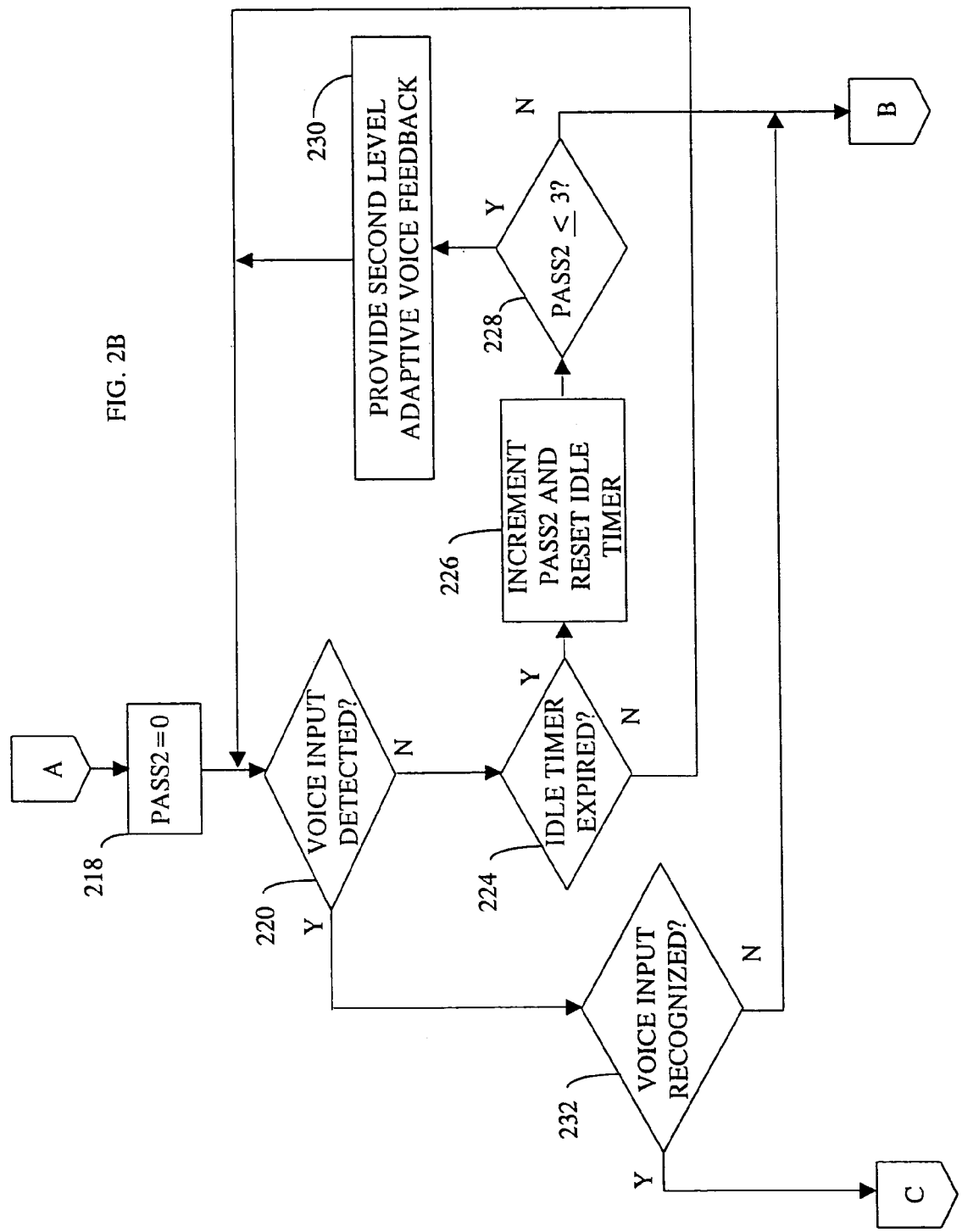
Figure 2C:
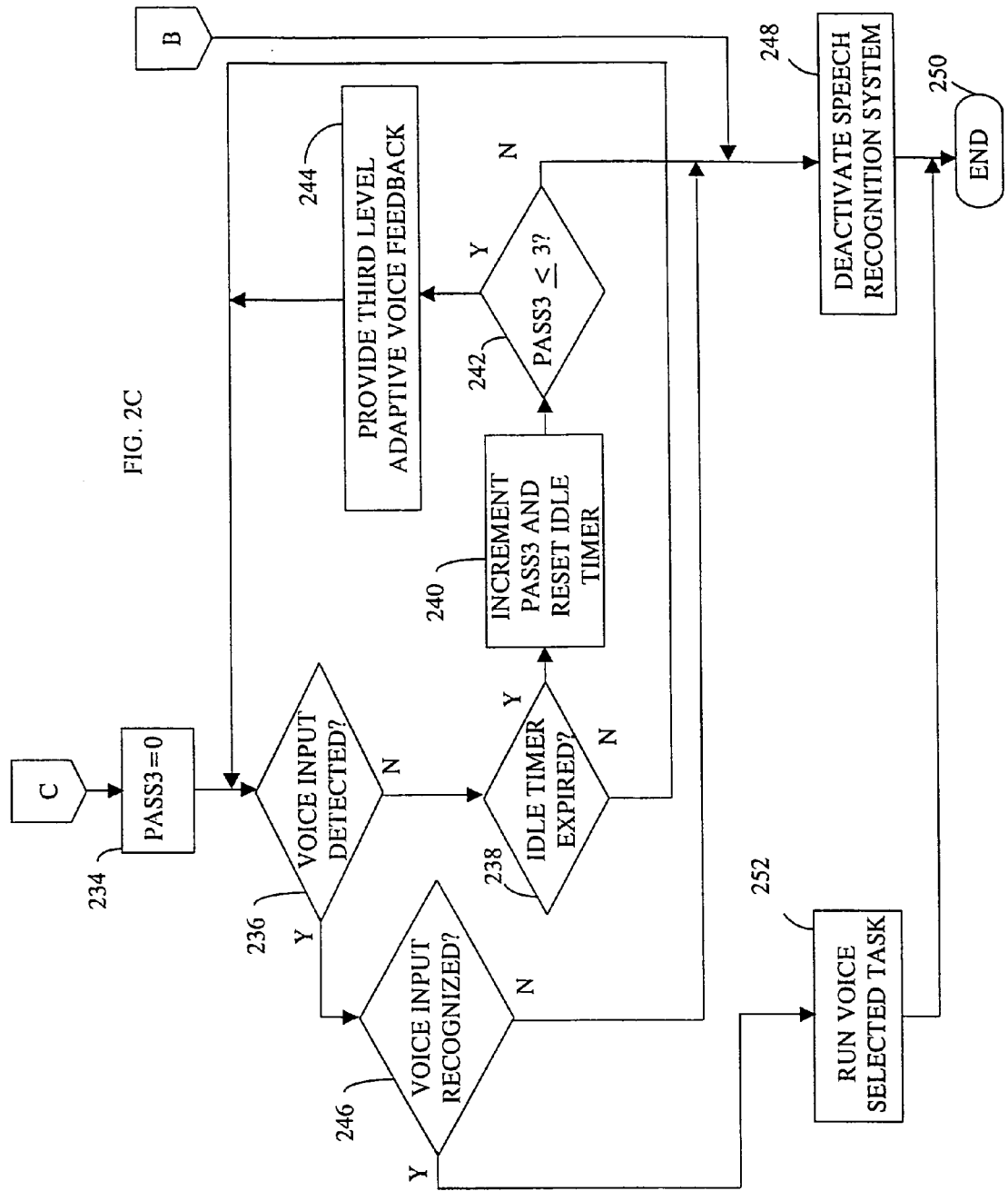

FIGS. 2A–2C are a flow diagram of an adaptive voice feedback routine 200, according to an embodiment of the present invention. In the embodiment of FIGS. 2A–2C, routine 200 determines whether a voice input, provided by a user, corresponds to, for example, a command. Routine 200 does not identify specific users. In step 202, the multi-level speech recognition driven system is activated. A user may activate the system, for example, through a voice command or by physically asserting a switch. From step 202, control transfers to step 204. In step 204, a first level variable "pass1", which tracks the number of times that a first level idle timer has expired, is initialized. From step 204, control transfers to step 206. In step 206, routine 200 determines whether a voice input has been detected. If so, control transfers from step 206 to step 216. If not, control transfers from step 206 to step 208. In step 208, routine 200 determines whether a first level idle timer has expired. If the first level idle timer has not expired in step 208, control transfers to step 206. If the first level idle timer has expired, control transfers from step 208 to step 210. In step 210, routine 200 causes the pass 1 variable to be incremented and resets the first level idle timer.

From step 210, control transfers to step 212. In step 212, routine 200 determines whether the "pass1" variable has exceeded a set value (in this case, three). One of ordinary skill in the art will appreciate that the decision threshold for the "pass1" variable can be adjusted, as desired. If the "pass1" variable is less than or equal to three, control transfers from step 212 to step 214. In step 214, routine 200 provides a first level adaptive voice feedback. This allows a user to determine which command should be spoken at that time. From step 214, control transfers to step 206. In step 212 if the "pass1" variable has exceeded the set value, control transfers to step 248. In step 248, routine 200 causes the speech recognition system to be deactivated. From step 248, control transfers to step 250 where the routine 200 ends.

In step 206, if voice input is detected, control transfers to step 216. In step 216, routine 200 determines whether the voice input is a recognized command. If so, control transfers from step 216 to step 218 (see FIG. 2B). If not, control transfers from step 216 to step 248. One of ordinary skill in the art will appreciate that if the voice input is not recognized, control can alternatively be transferred to step 214 (where first level adaptive voice feedback is provided). In step 218, a second level variable "pass2", which tracks the number of times that a second level idle timer has expired, is initialized. From step 218, control transfers to step 220. In step 220, if voice input is not detected, control transfers to step 224. In step 224, routine 200 determines whether the second level idle timer has expired. If the second level idle timer has not expired, control transfers from step 224 to step 220. If the second level idle timer has expired, control transfers from step 224 to step 226.

In step 226, routine 200 causes the "pass2" variable to be incremented and resets the second level idle timer. In step 228, routine 200 determines whether the "pass2" variable has exceeded a set value (in this case, three). One of ordinary skill in the art will appreciate that the decision threshold for the "pass2" variable can be adjusted, as desired. If the "pass2" variable has exceeded the set value, control transfers from step 228 to step 248. If the "pass2' variable has not exceeded the set value, control transfers from step 228 to step 230. In step 230, routine 200 provides an appropriate second level adaptive voice feedback. This allows a user to determine which command should be spoken at that time. From step 230, control transfers to step 220. In step 220, if voice input is detected, control transfers to step 232. In step 232, routine 200 determines whether the voice input is recognized. If so, control transfers from step 232 to step 234 (see FIG. 2C). If not, control transfers from step 232 to step 248. One of ordinary skill in the art will appreciate that, if the voice input is not recognized, control can alternatively be transferred to step 230 (where second level adaptive voice feedback is provided).

In step 234, a third level variable "pass3", which tracks the number of times that a third level idle timer has expired, is initialized. From step 234, control transfers to step 236. In step 236, routine 200 determines whether voice input is detected. If so, control transfers to step 246. If not, control transfers from step 236 to step 238. In step 238, routine 200 determines whether the third level idle timer has expired. If the third level idle timer has not expired in step 238, control transfers to step 236. If the third level idle timer has expired, control transfers from step 238 to step 240. In step 240, routine 200 causes the "pass3" variable to be incremented and resets the third level idle timer.

From step 240, control transfers to step 242. In step 242, routine 200 determines whether the "pass3" variable has exceeded a set value (in this case, three). One of ordinary skill in the art will appreciate that the decision threshold for the "pass3" (as well as "pass1" and "pass2") variable can be adjusted, as desired. If the "pass3" variable is less than or equal to three, control transfers from step 242 to step 244. In step 244, routine 200 provides an appropriate third level adaptive voice feedback. This allows a user to determine which command should be spoken at that time. From step 244, control transfers to step 236. In step 242 if the "pass3" variable has exceeded the set value, control transfers to step 248. In step 248, routine 200 causes the speech recognition system to be deactivated. From step 248, control transfers to step 250 where the routine 200 ends.

In step 246, routine 200 determines whether the voice input is recognized. If so, control transfers from step 246 to step 252. If not, control transfers from step 246 to step 248. One of ordinary skill in the art will appreciate that, if the voice input is not recognized control can alternatively be transferred to step 244 (where third level adaptive voice feedback is provided). In step 252, routine 200 causes the voice selected task to be ran. From step 252, control transfers to step 250 where routine 200 ends. Thus, a system has been described, which provides adaptive voice feedback when appropriate. This can be determined at each level by setting a level dependent idle timer to a particular value. Alternatively, the idle timer can be dialog branch dependent. As mentioned above, the number of times in which the idle timer is allowed to expire at a given level is also adjustable. As such, a system according to the present invention provides adaptive voice feedback that is appropriate for the experience level of the user. For example, if a user is inexperienced, the system will provide voice feedback at each level. However, if a user is experienced, the user can provide continuous voice input to the system and the system will not provide voice feedback to the user.

This allows a novice user to begin immediately using the speech recognition system without having to first study a user's guide. By monitoring the time since a voice input was last received (to determine whether to activate the adaptive voice feedback), the system can be advantageously used with a wide range of users with different experience levels. As discussed above, the system provides a context sensitive voice prompt, as required, to continue the voice dialog. A user may wait for adaptive voice feedback to complete the user's selection or the user may 'barge-in' with a desired command or use a word such as 'yes' or 'select' to indicate a desired option. While a three level dialog has been described, one of ordinary skill in the art will readily appreciate that the present invention can be implemented with systems that employ a different number of levels.

Figure 3:
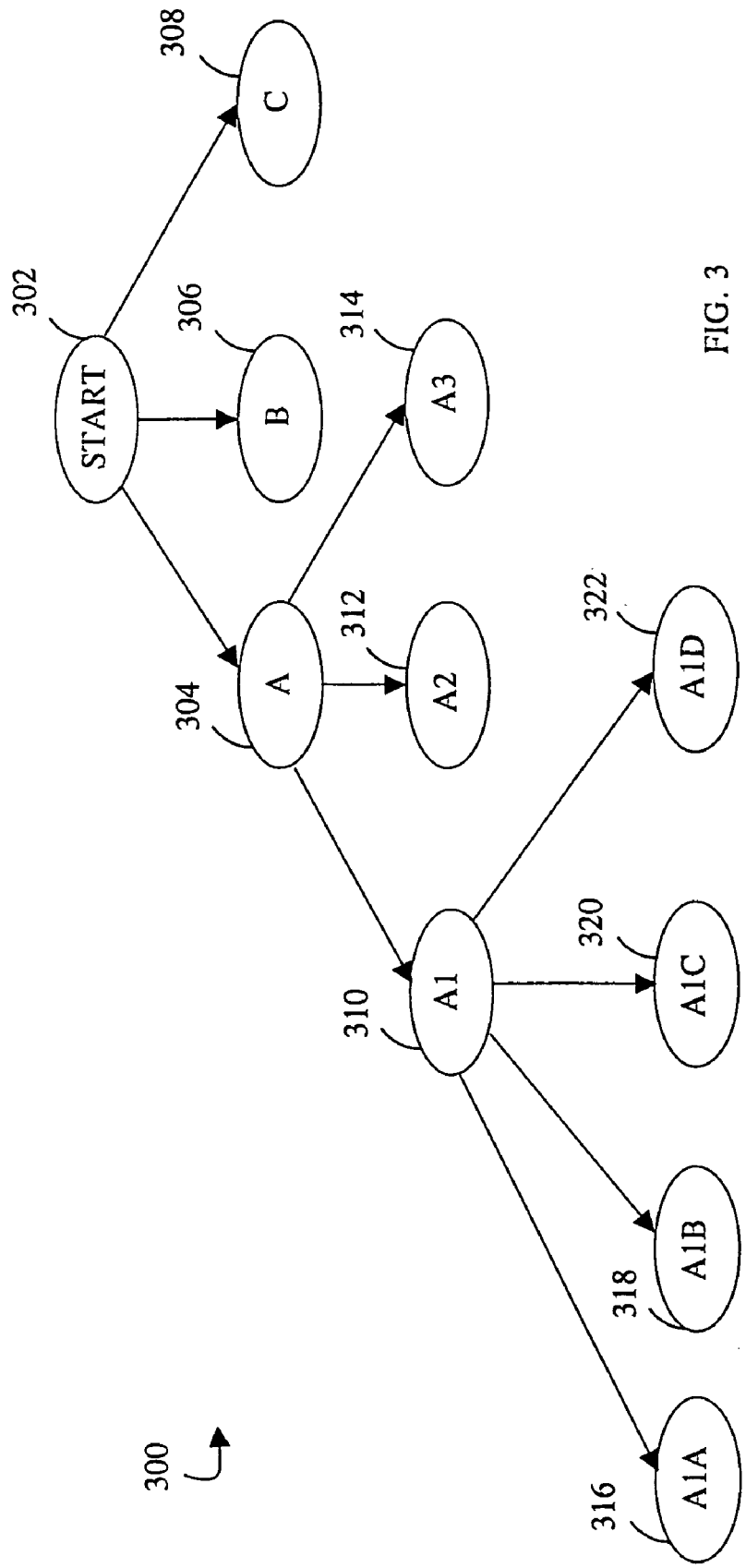
FIG. 3 is an exemplary dialog tree that can be implemented with an adaptive voice feedback system, according to an embodiment of the present invention.

FIG. 3 is an exemplary dialog tree 300 that further illustrates the functioning of the adaptive voice feedback feature, according to an embodiment of the present invention. At entry point 302 a user activates the speech driven system by speaking the keyword "start". An experienced user that already knows the functions that the user wants performed can then speak the commands in successive order. For example, an experienced user might speak the command string "A, A1, A1C" or "A, A2". On the other hand, an inexperienced user may hesitate after speaking the keyword "start", at which point the system supplies the first level commands "A, B or C" (corresponding to entry points 304, 306 and 308, respectively), after a predetermined time period. If an inexperienced user speaks the command "A" and then hesitates, the system supplies the second level commands "A1, A2 or A3" (corresponding to entry points 310, 312 and 314, respectively), after a predetermined time period. At that point, if an inexperienced user speaks the command "A1" and then hesitates, the system supplies the third level commands "A1A, A1B, A1C or A1D" (corresponding to entry points 316, 318, 320 and 322, respectively), after a predetermined time period.

Thus, if at any level a user is unsure of the next command, after an appropriate period, the system supplies an appropriate voice feedback with a list of commands necessary to continue. Thus, an inexperienced user can learn the system dialog while using the system. A user may receive a prompt after each spoken command because of the hesitation in thinking of the next word. On the other hand, an experienced user can immediately say all the words in a command and not receive a prompt. As another example, a driver of a motor vehicle attempting to utilize a radio within the motor vehicle may use the command "radio" to activate the radio. At that point, the driver may, for example, have the option of saying "AM", "FM", "tune", "mute", "balance" or "scan". If the driver provides the voice command "tune", the driver may have the option of tuning "up" or "down". Alternatively, the driver may enter a radio channel using a command string, such as, "Radio, FM, Channel, 101.1."

Figure 4A:
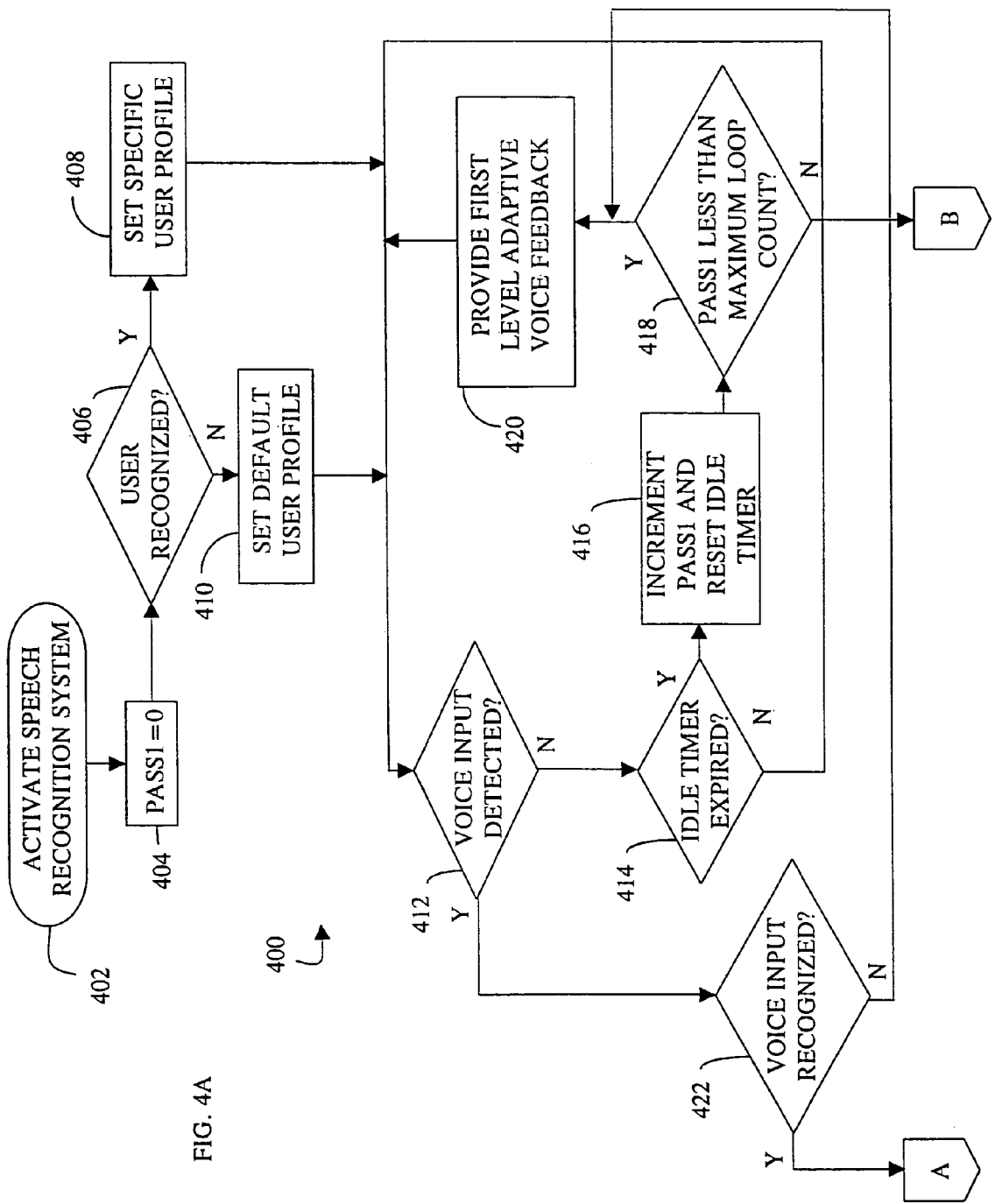
Figure 4B:
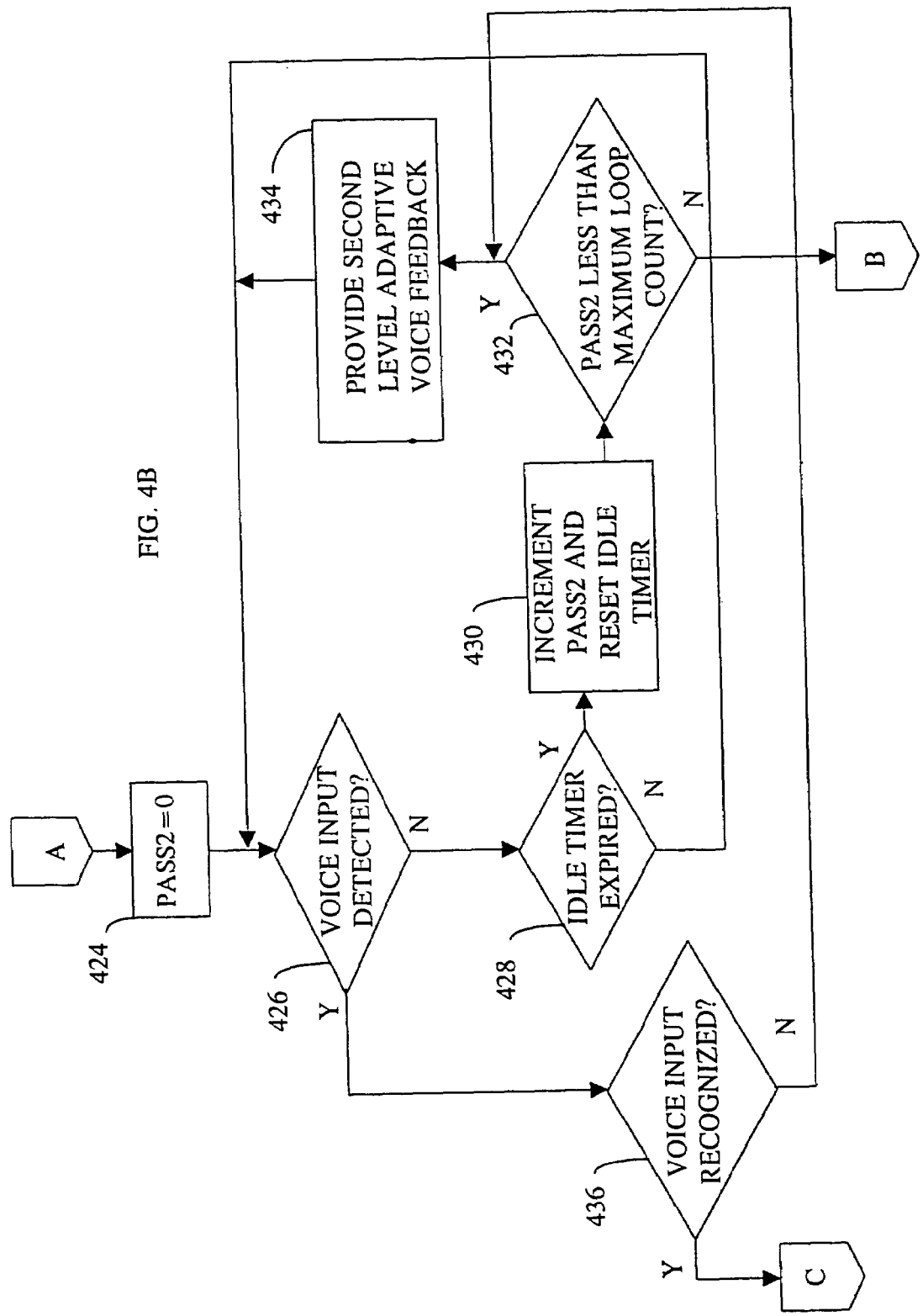

FIGS. 4A–4C are a flow diagram of a user specific adaptive voice feedback routine 400, according to another embodiment of the present invention. In the embodiment of FIGS. 4A–4C, routine 400 identifies a specific user from a voice input, as well as determining if the voice input corresponds to a particular system recognized input (e.g., command). In step 402, the multi-level speech recognition driven system is activated. While this example is directed to a speech activated system, one of ordinary skill in the art will appreciate that the techniques described herein can readily be applied to a switch activated system. In a switch activated" system, the switch is typically monitored by an input of processor 102. From step 402, control transfers to step 404. In step 404, a first level variable "pass1", which tracks the number of times that a user specific first level idle timer has expired, is initialized. From step 404, control transfers to step 406. In step 406, routine 400 determines whether a specific user is recognized by the speech recognition system. In a speech activated system, the voice input provided by a user, to activate the system, is compared (using commercially available voice recognition technology) to a plurality of established user voice patterns, if any.

The established user voice patterns are utilized in recognizing a specific user. If the specific user is recognized by the system, control transfers from step 406 to step 408. In step 408, a user profile that corresponds to the specific user is selected. The specific user profile establishes a predetermined user specific time period for a given level or dialog branch. The specific user profile also establishes a maximum loop count (a user specific set number that corresponds to the predetermined user specific time periods that are allowed to expire at a given level or dialog branch, before the system is deactivated).

In one embodiment, the predetermined user specific time period and the maximum loop count are adjusted by the system as the ability of the specific user changes. For example, as a specific user of the system becomes more familiar with the system these values are decreased. One of skill in the art will appreciate that the values can be adjusted, as desired. This can be readily accomplished by utilizing artificial intelligence code, fuzzy logic, neural networks or other such adaptable networks, well known to one of ordinary skill in the art, that track the ability of each user. From step 408, control then transfers to step 412.

If the specific user is not recognized by the system (e.g., a new user) in step 406, control transfers to step 410 where a default user profile is established. Thereafter, a profile for that new user is stored within the system such that when that user utilizes the system again, the profile for that specific user is selected. One of ordinary skill in the art will readily appreciate that the number of such new users that can be added to the system is only limited by the system resources (e.g., volatile and non-volatile memory, processing power, etc.). From step 410, control transfers to step 412. In step 412, routine 400 determines whether a voice input has been detected. One of skill in the art will appreciate that if the system is not voice activated, the determination of the specific user would occur after a voice input (e.g., a spoken command) is received.

If a voice input is detected, control transfers from step 412 to step 422. If not, control transfers from step 412 to step 414. In step 414, routine 400 determines whether a user specific first level idle timer has expired. If the first level idle timer has not expired in step 414, control transfers to step 412. If the first level idle timer has expired, control transfers from step 414 to step 416. In step 416, routine 400 causes the "pass1" variable to be incremented and resets the first level idle timer. As discussed above, the value of the first level idle timer is user specific.

From step 416, control transfers to step 418. In step 418, routine 400 determines whether the "pass1" variable is less than a maximum loop count (i.e., a user specific set number that indicates the number of times that a predetermined user specific time period has expired). As discussed above, the decision threshold for the "pass1" variable is user specific and is adjusted by the adaptable module 126 or a routine running on processor 102. If the "pass1" variable is less than the maximum loop count, control transfers from step 418 to step 420. In step 420, routine 400 provides a first level adaptive voice feedback. This allows a user to determine which command should be spoken at that time. From step 420, control transfers to step 412. In step 418 if the "pass1" variable has exceeded the maximum loop count, control transfers to step 454. In step 454, routine 400 causes the speech recognition system to be deactivated. From step 454, control transfers to step 456 where routine 400 ends.

In step 412, if voice input is detected, control transfers to step 422. In step 422, routine 400 determines whether the voice input is recognized. If so, control transfers from step 422 to step 424 (see FIG. 4B). If not, control transfers from step 422 to step 420 (where first level adaptive voice feedback is provided). One of ordinary skill in the art will appreciate that if the voice input is not recognized, control can alternatively be transferred to step 454. In step 424, a second level variable "pass2", which tracks the number of times that a user specific second level idle timer has expired, is initialized. From step 424, control transfers to step 426. In step 426, if voice input is not detected, control transfers to step 428. In step 428, routine 400 determines whether the second level idle timer has expired. If the second level idle timer has not expired, control transfers from step 428 to step 426. If the second level idle timer has expired, control transfers from step 428 to step 430.

In step 430, routine 400 causes the "pass2" variable to be incremented and resets the second level idle timer. From step 430, control then transfers to step 432. In step 432, routine 400 determines whether the "pass2" variable is less than a maximum loop count (i.e., a user specific set number that indicates the number of times that a predetermined user specific time period has expired). As discussed above, the decision threshold for the "pass2" variable is user specific and is adjusted by the system as determined by adaptable module 126 or a routine running on processor 102. If the "pass2" variable is not less than the maximum loop count, control transfers from step 432 to step 454. If the "pass2" variable is less than the maximum loop count, control transfers from step 432 to step 434.

In step 434, routine 400 provides an appropriate second level adaptive voice feedback. This allows a user to determine which command should be spoken at that time. From step 434, control transfers to step 426. In step 426, if voice input is detected, control transfers to step 436. In step 436, routine 400 determines whether the voice input is recognized. If so, control transfers from step 436 to step 438 (see FIG. 4C). If not, control transfers from step 436 to step 434 (where second level adaptive voice feedback is provided). One of ordinary skill in the art will appreciate that, if the voice input is not recognized, control can alternatively be transferred to step 454.

In step 438, a third level variable "pass3", which tracks the number of times that a user specific third level idle timer has expired, is initialized. From step 438, control transfers to step 440. In step 440, routine 400 determines whether voice input is detected. If so, control transfers to step 450. If not, control transfers from step 440 to step 442. In step 442, routine 400 determines whether the third level idle timer has expired. If the third level idle timer has not expired in step 442, control transfers to step 440. If the third level idle timer has expired, control transfers from step 442 to step 444. In step 444, routine 400 causes the "pass3" variable to be incremented and resets the third level idle timer.

From step 444, control transfers to step 446. In step 446, routine 400 determines whether the "pass3" variable has exceeded a maximum loop count. As discussed above, the decision threshold for the "pass3" (as well as "pass1" and "pass2") variable is adjusted as the experience level of each specific user changes. If the "pass3" variable is less than the maximum loop count, control transfers from step 446 to step 448. In step 448, routine 400 provides an appropriate third level adaptive voice feedback. This allows a user to determine which command should be spoken at that time. From step 448, control transfers to step 440. In step 446 if the "pass3" variable is not less than the maximum loop count, control transfers to step 454. In step 454, routine 400 causes the speech recognition system to be deactivated. From step 454, control transfers to step 456 where the routine 400 ends.

In step 450, routine 400 determines whether the voice input is recognized. If so, control transfers from step 450 to step 452. If not, control transfers from step 450 to step 448 (where third level adaptive voice feedback is provided). One of ordinary skill in the art will appreciate that, if the voice input is not recognized, control can alternatively be transferred to step 454. In step 452, routine 400 causes the voice selected task to be ran. From step 452, control transfers to step 456 where routine 400 ends.

Thus, an alternative system has been described, which provides user specific adaptive voice feedback, when appropriate. Adaptable module 126 or a routine running on processor 102 functions to change a user specific idle timer, that is either level or dialog branch dependent. As mentioned above, adaptable module 126 or a routine running on processor 102 also functions to change the number of times in which the user specific idle timer is allowed to expire. This can be level or dialog branch dependent. As such, a system according to the present invention provides adaptive voice feedback that is presented at an appropriate time for a specific user. When a specific user advances in knowledge of the system, the system adjusts the idle timers for that user. In this manner, the time frame in which voice feedback is provided is customized for each recognized user. While a three level dialog has been described, one of ordinary skill in the art will readily appreciate that this embodiment of the present invention can be implemented with systems that employ a different number of levels.

The above description is considered that of the preferred embodiments only. Modification of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

What is claimed is:

1. A method for providing user specific adaptive voice feedback in a multi-level speech recognition driven system, comprising the steps of:

detecting whether a user of the speech recognition driven system has provided a voice input;

determining whether a voice input is associated with a specific user that is recognized by the speech recognition driven system;

providing adaptive voice feedback to the user when the user has not provided a voice input for a predetermined user specific time Period, wherein the adaptive voice feedback is level dependent and provides available commands for a current level;

determining whether the voice input Provided by the user is recognized by the speech recognition driven system;

performing a speech selectable task when the voice input provided by the user corresponds to a speech selectable task that is recognized by the speech recognition driven system;

tracking the number of times in which the user has failed to respond for the predetermined user specific time period at a given level; and deactivating the speech recognition driven system when the user has failed to respond for a user specific set number of the predetermined user specific time periods at the given level, wherein the speech recognition system utilizes voice recognition technology in determining whether a voice input is associated with a specific user, and wherein the predetermined user specific time period and the user specific set number of the predetermined user specific time periods are adjusted by the speech recognition driven system as the ability of a specific user changes, and wherein a neural network is utilized to adjust the predetermined user specific time period and the user specific set number of the predetermined user specific time periods when the ability of a specific user changes.

2. The method of claim 1, further including the step of: deactivating the speech recognition driven system when the voice input from the user is not recognized by the speech recognition driven system.

3. The method of claim 1, wherein if a voice input is not associated with a specific user the predetermined user specific time period and the user specific set number of the predetermined user specific time periods are set to default values.

4. The method of claim 1, further including the step of: activating the speech recognition driven system.

5. The method of claim 4, wherein the speech recognition driven system is switch activated.

6. The method of claim 4, wherein the speech recognition driven system is voice activated.

7. The method of claim 1, wherein the predetermined user specific time period and the user specific set number of predetermined user specific time periods are level dependent.

8. The method of claim 1, wherein the predetermined user specific time period and the user specific set number of predetermined user specific time periods are dialog branch dependent.

9. The method of claim 1, wherein the speech selectable task is performed by a motor vehicle accessory.

10. A method for providing user specific adaptive voice feedback in a multi-level speech recognition driven system, comprising the steps of:

detecting whether a user of the speech recognition driven system has provided a voice input:

determining whether a voice input is associated with a specific user that is recognized by the speech recognition driven system;

providing adaptive voice feedback to the user when the user has not provided a voice input for a predetermined user specific time period, wherein the adaptive voice feedback is level dependent and provides available commands for a current level;

determining whether the voice input provided by the user is recognized by the speech recognition driven system;

performing a speech selectable task when the voice input provided by the user corresponds to a speech selectable task that is recognized by the speech recognition driven system;

tracking the number of times in which the user has failed to respond for the predetermined user specific time period at a given level; and deactivating the speech recognition driven system when the user has failed to respond for a user specific set number of the predetermined user specific time periods at the given level;

wherein the speech recognition system utilizes voice recognition technology in determining whether a voice input is associated with a specific user; and wherein the predetermined user specific time period and the user specific set number of the predetermined user specific time periods are adjusted by the speech recognition driven system as the ability of a specific user changes, and wherein fuzzy logic is utilized to adjust the predetermined user specific time period and the user specific set number of the predetermined user specific time periods when the ability of a specific user changes.

11. The method of claim 10, wherein if a voice input is not associated with a specific user the predetermined user specific time period and the user specific set number of the predetermined user specific time periods are set to default values.

12. The method of claim 10, further including the step of: deactivating the speech recognition driven system when the voice input from the user is not recognized by the speech recognition driven system.

13. The method of claim 10, further including the step of: activating the speech recognition driven system.

14. The method of claim 13, wherein the speech recognition driven system is switch activated.

15. The method of claim 13, wherein the speech recognition driven system is voice activated.

16. The method of claim 10, wherein the predetermined user specific time period and the user specific set number of predetermined user specific time periods are level dependent.

17. The method of claim 10, wherein the predetermined user specific time period and the user specific set number of predetermined user specific time periods are dialog branch dependent.

18. The method of claim 10, wherein the speech selectable task is performed by a motor vehicle accessory.

19. A multi-level speech recognition driven system for providing user specific adaptive voice feedback, comprising:

a memory subsystem for storing information;

a processor coupled to the memory subsystem;

an audio input device coupled to the processor, the input device receiving a voice input from a user;

an audio output device coupled to the processor, the output device providing adaptive voice feedback to the user; and speech recognition code for causing the processor to perform the steps of:

detecting whether a user of the speech recognition driven system has provided a voice input;

determining whether a voice input is associated with a specific user that is recognized by the speech recognition driven system;

providing adaptive voice feedback to the user when the user has not provided a voice input for a predetermined user specific time period, wherein the adaptive voice feedback is level dependent and provides available commands for a current level;

determining whether the voice input Provided by the user is recognized by the speech recognition driven system; and performing a speech selectable task when the voice input provided by the user corresponds to a speech selectable task that is recognized by the speech recognition driven system, wherein the speech recognition code causes the processor to perform the additional steps of:

tracking the number of times in which the user has failed to respond for the predetermined user specific time Period at a given level; and deactivating the speech recognition driven system when the user has failed to respond for a user specific set number of the predetermined user specific time periods at the given level, wherein the speech recognition system utilizes voice recognition technology in determining whether a voice input is associated with a specific user, and wherein the predetermined user specific time period and the user specific set number of the predetermined user specific time periods are adjusted by the speech recognition driven system as the ability of a specific user changes, and wherein a neural network is utilized to adjust the predetermined user specific time period and the user specific set number of the predetermined user specific time periods when the ability of a specific user changes.

20. The system of claim 19, wherein if a voice input is not associated with a specific user the predetermined user specific time period and the user specific set number of the predetermined user specific time periods are set to default values.

21. The system of claim 19, wherein the predetermined user specific time period and the user specific set number of the predetermined user specific time periods are level dependent.

22. The system of claim 19, wherein the predetermined user specific time period and the user specific set number of predetermined user specific time periods are dialog branch dependent.

23. The system of claim 19, wherein the speech recognition code causes the processor to perform the additional step of:

deactivating the speech recognition driven system when the voice input from the user is not recognized by the speech recognition driven system.

24. The system of claim 19, wherein the audio input device is a microphone.

25. The system of claim 19, wherein the speech recognition code causes the processor to perform the additional step of:

activating the speech recognition driven system.

26. The system of claim 25, wherein the speech recognition driven system is switch activated.

27. The system of claim 25, wherein the speech recognition driven system is voice activated.

28. The system of claim 19, wherein the audio output device is a speaker.

29. The system of claim 19, wherein the speech selectable task is performed by a motor vehicle accessory.

30. A multi-level speech recognition driven system for providing user specific adaptive voice feedback, comprising:

a memory subsystem for storing information;

a processor coupled to the memory subsystem;

an audio input device coupled to the processor, the input device receiving a voice input from a user;

an audio output device coupled to the processor, the output device providing adaptive voice feedback to the user; and speech recognition code for causing the processor to perform the steps of:

detecting whether a user of the speech recognition driven system has provided a voice input;

determining whether a voice input is associated with a specific user that is recognized by the speech recognition driven system;

providing adaptive voice feedback to the user when the user has not provided a voice input for a predetermined user specific time period, wherein the adaptive voice feedback is level dependent and provides available commands for a current level;

determining whether the voice input provided by the user is recognized by the speech recognition driven system; and performing a speech selectable task when the voice input provided by the user corresponds to a speech selectable task that is recognized by the speech recognition driven system, wherein the speech recognition code causes the processor to perform the additional steps of:

tracking the number of times in which the user has failed to respond for the predetermined user specific time period at a given level; and deactivating the speech recognition driven system when the user has failed to respond for a user specific set number of the predetermined user specific time periods at the given level, wherein the speech recognition system utilizes voice recognition technology in determining whether a voice input is associated with a specific user, and wherein the predetermined user specific time period and the user specific set number of the predetermined user specific time periods are adjusted by the speech recognition driven system as the ability of a specific user changes, and wherein fuzzy logic is utilized to adjust the predetermined user specific time period and the user specific set number of the predetermined user specific time periods when the ability of a specific user changes.

31. The system of claim 30, wherein if a voice input is not associated with a specific user the predetermined user specific time period and the user specific set number of the predetermined user specific time periods are set to default values.

32. The system of claim 30, wherein the speech recognition code causes the processor to perform the additional step of:

deactivating the speech recognition driven system when the voice input from the user is not recognized by the speech recognition driven system.

33. The system of claim 30, wherein the speech recognition code causes the processor to perform the additional step of:

activating the speech recognition driven system.

34. The system of claim 33, wherein the speech recognition driven system is switch activated.

35. The system of claim 33, wherein the speech recognition driven system is voice activated.

36. The system of claim 30, wherein the predetermined user specific time period and the user specific set number of the predetermined user specific time periods are level dependent.

37. The system of claim 30, wherein the predetermined user specific time period and the user specific set number of predetermined user specific time Periods are dialog branch dependent.

38. The system of claim 30, wherein the audio input device is a microphone.

39. The system of claim 30, wherein the audio output device is a speaker.

40. The system of claim 30, wherein the speech selectable task is performed by a motor vehicle accessory.

41. A multi-level speech recognition driven system for controlling motor vehicle accessories that provides user specific adaptive voice feedback, comprising:
a memory subsystem for storing information;
a processor coupled to the memory subsystem;
a motor vehicle accessory coupled to the processor;
an audio input device coupled to the processor, the input device receiving a voice input from a user;
an audio output device coupled to the processor, the output device providing adaptive voice feedback to the user; and
speech recognition code for causing the processor to Perform the steps of:
detecting whether a user of the speech recognition driven system has provided a voice input;
determining whether a voice input is associated with a specific user that is recognized by the speech recognition driven system;
providing adaptive voice feedback to the user when the user has not provided a voice input for a predetermined user specific time period, wherein the adaptive voice feedback is level dependent and provides available commands for a current level;
determining whether the voice input provided by the user is recognized by the speech recognition driven system; and
controlling the motor vehicle accessory according to a speech selectable task when the voice input Provided by the user corresponds to a speech selectable task that is recognized by the speech recognition driven system,
wherein the speech recognition code causes the processor to perform the additional steps of:
tracking the number of times in which the user has failed to respond for the predetermined user specific time period at a given level; and
deactivating the speech recognition driven system when the user has failed to respond for a user specific set number of the Predetermined user specific time periods at the given level,
wherein the speech recognition system utilizes voice recognition technology in determining whether a voice input is associated with a specific user, and
wherein the predetermined user specific time period and the user specific set number of the predetermined user specific time periods are adjusted by the speech recognition driven system as the ability of a specific user changes, and
wherein a neural network is utilized to adjust the predetermined user specific time period and the user specific set number of the predetermined user specific time periods when the ability of a specific user changes.

42. The system of claim 41, wherein the speech recognition code causes the processor to perform the additional step of:
activating the speech recognition driven system.

43. The system of claim 42, wherein the speech recognition driven system is switch activated.

44. The system of claim 42, wherein the speech recognition driven system is voice activated.

45. The system of claim 41, wherein the predetermined user specific time period and the user specific set number of the predetermined user specific time periods are level dependent.

46. The system of claim 41, wherein the predetermined user specific time period and the user specific set number of predetermined user specific time periods are dialog branch dependent.

47. The system of claim 41, wherein the audio input device is a microphone.

48. The system of claim 41, wherein the audio output device is a speaker.

49. The system of claim 41, wherein if a voice input is not associated with a specific user the predetermined user specific time period and the user specific set number of the predetermined user specific time periods are set to default values.

50. The system of claim 41, wherein the speech recognition code causes the processor to perform the additional step of:
deactivating the speech recognition driven system when the voice input from the user is not recognized by the speech recognition driven system.

51. A multi-level speech recognition driven system for controlling motor vehicle accessories that provides user specific adaptive voice feedback, comprising:
a memory subsystem for storing information;
a processor coupled to the memory subsystem;
a motor vehicle accessory coupled to the processor;
an audio input device coupled to the processor, the input device receiving a voice input from a user;
an audio output device coupled to the processor, the output device providing adaptive voice feedback to the user; and
speech recognition code for causing the processor to perform the steps of:
detecting whether a user of the speech recognition driven system has provided a voice input;
determining whether a voice input is associated with a specific user that is recognized by the speech recognition driven system;
providing adaptive voice feedback to the user when the user has not provided a voice input for a predetermined user specific time period, wherein the adaptive voice feedback is level dependent and provides available commands for a current level;
determining whether the voice input provided by the user is recognized by the speech recognition driven system; and
controlling the motor vehicle accessory according to a speech selectable task when the voice input provided by the user corresponds to a speech selectable task that is recognized by the speech recognition driven system, wherein the speech recognition code causes the processor to perform the additional steps of:

tracking the number of times in which the user has failed to respond for the predetermined user specific time period at a given level; and deactivating the speech recognition driven system when the user has failed to respond for a user specific set number of the predetermined user specific time periods at the given level, wherein the speech recognition system utilizes voice recognition technology in determining whether a voice input is associated with a specific user, and wherein the predetermined user specific time period and the user specific set number of the predetermined user specific time periods are adjusted by the speech recognition driven system as the ability of a specific user changes, and wherein fuzzy logic is utilized to adjust the predetermined user specific time period and the user specific set number of the predetermined user specific time periods when the ability of a specific user changes.

52. The system of claim 51, wherein if a voice input is not associated with a specific user the predetermined user specific time period and the user specific set number of the predetermined user specific time periods are set to default values.

53. The system of claim 51, wherein the speech recognition code causes the processor to perform the additional step of:

deactivating the speech recognition driven system when the voice input from the user is not recognized by the speech recognition driven system.

54. The system of claim 51, wherein the speech recognition code causes the processor to perform the additional step of:

activating the speech recognition driven system.

55. The system of claim 54, wherein the speech recognition driven system is switch activated.

56. The system of claim 54, wherein the speech recognition driven system is voice activated.

57. The system of claim 51, wherein the predetermined user specific time period and the user specific set number of the predetermined user specific time periods are level dependent.

58. The system of claim 51, wherein the predetermined user specific time period and the user specific set number of predetermined user specific time periods are dialog branch dependent.

59. The system of claim 51, wherein the audio input device is a microphone.

60. The system of claim 51, wherein the audio output device is a speaker.

* * * * *